(12) United States Patent
Shimomura

(10) Patent No.: US 8,830,288 B2
(45) Date of Patent: Sep. 9, 2014

(54) OPTICAL SCANNING APPARATUS HAVING AN OPTICAL ELEMENT WITH AT LEAST ONE OF AN INCIDENT OR EXIT SURFACE THEREOF THAT IS DECENTERED IN A SUB-SCANNING SECTION AND IMAGE FORMING APPARATUS THEREWITH

(71) Applicant: Canon Kabushiki Kaisha, Tokyo (JP)

(72) Inventor: Hidekazu Shimomura, Yokohama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/869,268

(22) Filed: Apr. 24, 2013

(65) Prior Publication Data

US 2013/0278704 A1 Oct. 24, 2013

(30) Foreign Application Priority Data

Apr. 24, 2012 (JP) ................................. 2012-098674

(51) Int. Cl.
 B41J 15/14 (2006.01)
 B41J 27/00 (2006.01)
 G02B 26/10 (2006.01)
 G02B 26/12 (2006.01)

(52) U.S. Cl.
 CPC .............. *G02B 26/10* (2013.01); *G02B 26/123* (2013.01)
 USPC ......................................... 347/244; 347/258

(58) Field of Classification Search
 USPC ................. 347/230, 231, 241–244, 256–261; 359/205.1–207.5, 711
 See application file for complete search history.

(56) References Cited

U.S. PATENT DOCUMENTS

| | | | | |
|---|---|---|---|---|
| 5,671,079 | A | * | 9/1997 | Nagasaka et al. ........... 359/205.1 |
| 6,803,942 | B2 | * | 10/2004 | Sato et al. ...................... 347/259 |
| 7,380,720 | B2 | * | 6/2008 | Shimomura ............. 235/462.41 |
| 7,385,181 | B2 | * | 6/2008 | Miyatake et al. ............. 250/234 |
| 2007/0159520 | A1 | * | 7/2007 | Tanimura ...................... 347/225 |

FOREIGN PATENT DOCUMENTS

| | | |
|---|---|---|
| JP | 2004-309559 A | 11/2004 |
| JP | 2004-361941 A | 12/2004 |
| JP | 2005-234110 A | 9/2005 |
| JP | 2006-126534 A | 5/2006 |
| JP | 2007-155838 A | 6/2007 |
| JP | 2007-178748 A | 7/2007 |
| JP | 2009-122329 A | 6/2009 |

* cited by examiner

*Primary Examiner* — Hai C Pham
(74) *Attorney, Agent, or Firm* — Rossi, Kimms & McDowell LLP

(57) ABSTRACT

An optical scanning apparatus includes a light source, a deflector that deflects a light beam in a main scanning direction, an incident optical system that makes the light beam enter the deflecting surface in a sub-scanning section, and an imaging optical system that includes at least one imaging optical element and condenses the light beam onto a surface to be scanned, in which at least one of an incident surface and an exit surface of the at least one imaging optical element is decentered in the sub-scanning section such that an origin position line exists in a region sandwiched between marginal rays at two sub-scanning direction ends of the light beam, the origin position line being extended in the main scanning direction and passing through an origin of an aspherical surface formula defining a surface shape of each of the incident surface and the exit surface in the sub-scanning section.

12 Claims, 11 Drawing Sheets

INCIDENT SURFACE

EXIT SURFACE

NON-ARC AMOUNT OF SAGITTAL LINE
($\mu$m/4mm WIDTH)

COMA ($\lambda$)

OPTICAL SCANNING APPARATUS HAVING AN OPTICAL ELEMENT WITH AT LEAST ONE OF AN INCIDENT OR EXIT SURFACE THEREOF THAT IS DECENTERED IN A SUB-SCANNING SECTION AND IMAGE FORMING APPARATUS THEREWITH

BACKGROUND OF THE INVENTION

1. Field of the Invention

The present invention relates to an optical scanning apparatus and an image forming apparatus and, more particularly, to a color image forming apparatus such as a laser beam printer, a digital copying machine, or a multifunction printer, which has an electrophotographic process.

2. Description of the Related Art

Conventionally, an optical scanning apparatus is used in a laser beam printer (LBP), a digital copying machine, a multifunction printer, or the like. In this optical scanning apparatus, a light beam optically modulated and emitted by a light source is periodically deflected in accordance with an image signal by, for example, a deflector formed from a rotating polygon mirror. An imaging optical system having the f-θ characteristic condenses the deflected light beam to a spot on the photosensitive surface of a photosensitive member (photosensitive drum) and optically scans the photosensitive surface, thereby recording an image.

As an optical scanning apparatus used in a color image forming apparatus, there is known an optical scanning apparatus employing a system (sub-scanning oblique incident system) that causes a plurality of photosensitive drums to share one deflector and makes an light beam obliquely enter the deflecting surface of the deflector in the sub-scanning section (FIG. 12A). According to the sub-scanning oblique incident system, a plurality of light beams toward the photosensitive surfaces can be separated without making the deflecting surface of the deflector large in the sub-scanning direction.

Japanese Patent Application Laid-Open No. 2007-178748 discloses an optical scanning apparatus employing a sub-scanning oblique incident system in which the spot position on the lens surfaces (incident surface and exit surface) of a lens included in the imaging optical system forms a scanning locus across the lens center line (a line that passes through the center reference position of the lens surfaces and extends in the main scanning direction). Japanese Patent Application Laid-Open No. 2004-361941 discloses an optical scanning apparatus that tilts the plane normal of each lens surface and changes the tilt in the main scanning direction in the sub-scanning section.

When plastic-molding an imaging optical element included in the imaging optical system used in the optical scanning apparatus, the following manufacturing method is used. That is, the method includes the steps of making a mold based on a design value, evaluating the optical performance of the lens surface of an imaging optical element molded using the mold, correcting the mold based on the result of optical performance evaluation, and molding an imaging optical element using the corrected mold. In the optical performance evaluation, the shape of the lens at the light beam passing position is evaluated.

An optical scanning apparatus used in a monochrome image forming apparatus does not employ the sub-scanning oblique incident system. For this reason, the light beam scans on a line (meridian line) that passes the origin of an aspherical surface formula defining the lens surface shape in the sub-scanning section including the optical axis of the imaging optical system and is extended in the main scanning direction. That is, it is possible to easily evaluate the optical performance (evaluate the lens shape on the meridian line).

In a color image forming apparatus, however, beams pass positions far apart from an origin position CL of an imaging optical element 7A, as shown in FIGS. 12B and 12C. In addition, as shown in FIG. 13, the beams pass through scanning loci largely curved on the lens surface of the imaging optical element 7A. Note that in FIG. 12C, each lens surface is tilted and decentered, and the origin position CL is set in a plane P0 that passes the center of a deflecting surface 5a in the sub-scanning direction and is perpendicular to the rotation axis of a deflector 5. In FIG. 12B, the origin position CL is shifted and decentered from the plane P0 in the sub-scanning direction by a decentering amount ΔZ.

When the beams pass the positions far apart in the sub-scanning direction from the origin position CL of the lens surface, as described above, it is not possible to easily evaluate the optical performance. It is necessary to correctly measure, for example, the meridian line shape of the lens, the radius of curvature (the radius of curvature of the sagittal line) in the sub-scanning section, the tilt amount of the lens surface, the non-arc amount of the sagittal line, and the like and evaluate the optical performance in consideration of all of them. The lens surface shape evaluation at the beam passing position is possible only when the plurality of items are correctly measured. Hence, the mold correction accuracy lowers, and the number of times of correction increases.

SUMMARY OF THE INVENTION

The present invention enables to increase the molding accuracy of the lens surface shape of an imaging optical element in an optical scanning apparatus and an image forming apparatus employing a sub-scanning oblique incident system.

According to one aspect of the present invention, there is provided an optical scanning apparatus including a light source, a deflector that deflects, by a deflecting surface, a light beam emitted by the light source in a main scanning direction for scanning, an incident optical system that makes the light beam emitted by the light source obliquely enter the deflecting surface of the deflector in a sub-scanning section perpendicular to the main scanning direction, and an imaging optical system that includes at least one imaging optical element and condenses the light beam deflected by the deflecting surface of the deflector onto a surface to be scanned, in which at least one of an incident surface and an exit surface of the at least one imaging optical element is decentered in the sub-scanning section including an optical axis of the imaging optical system such that an origin position line exists in a region sandwiched between marginal rays at two sub-scanning direction ends of the light beam deflected by the deflecting surface of the deflector, the origin position line being extended in the main scanning direction and passing through an origin of an aspherical surface formula defining a surface shape of each of the incident surface and the exit surface in the sub-scanning section including the optical axis of the imaging optical system.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Color Image Forming Apparatus

Figure 11:
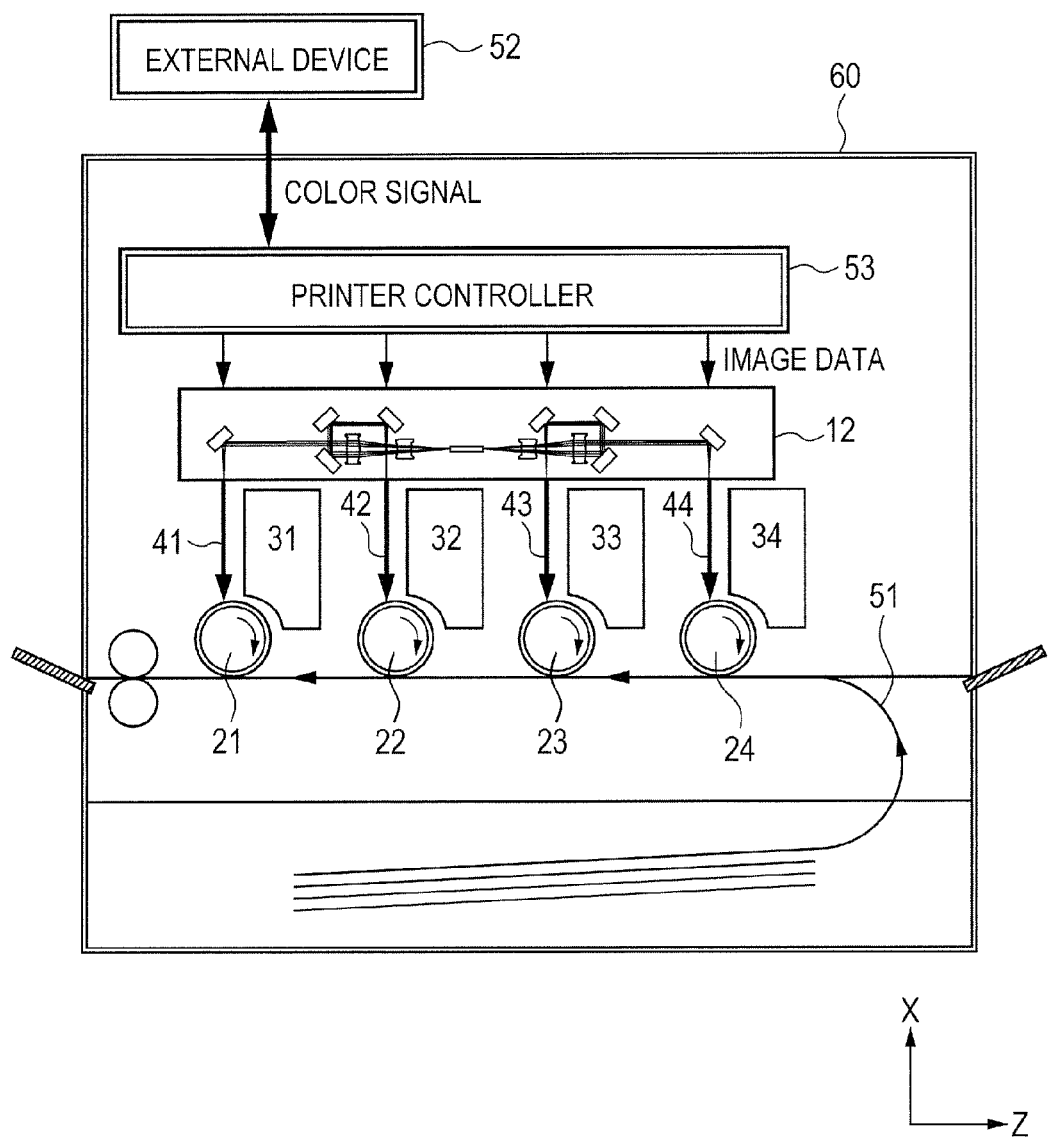
FIG. 11 is a schematic view of the main parts of a color image forming apparatus.
Figure 12A:
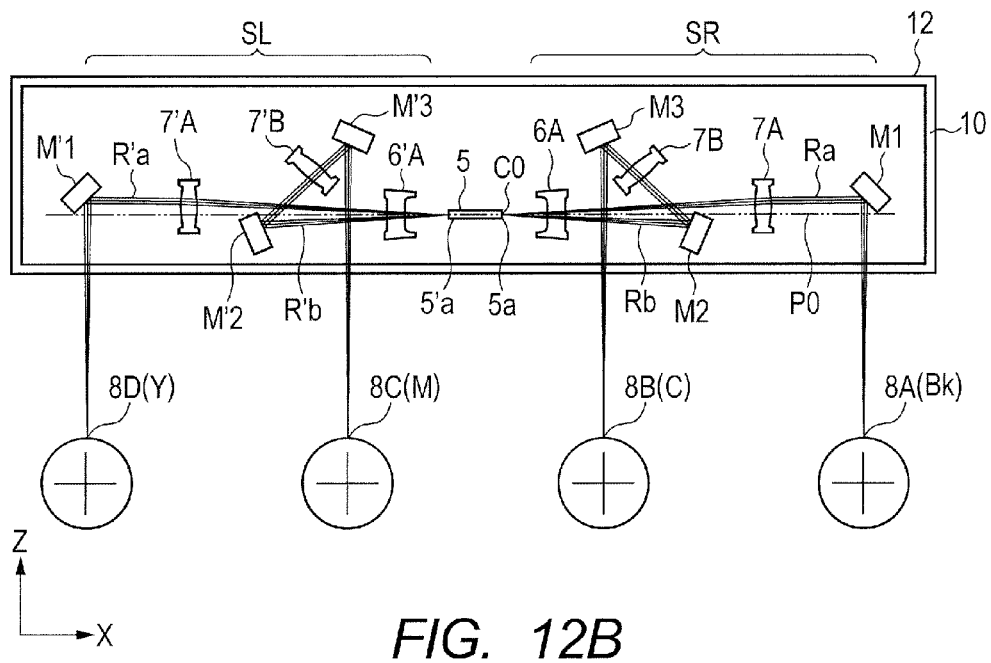
FIG. 12A is a sub-scanning sectional view of a conventional oblique incident optical system.
Figure 12B:
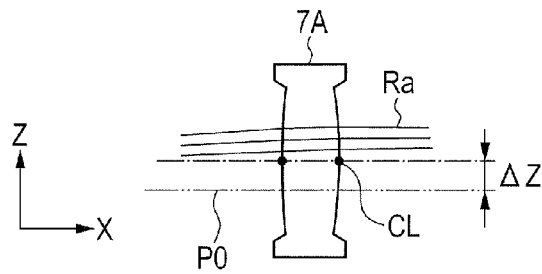
FIG. 12B is an enlarged view of a portion near an imaging optical element 7A of the conventional oblique incident optical system.
Figure 12C:
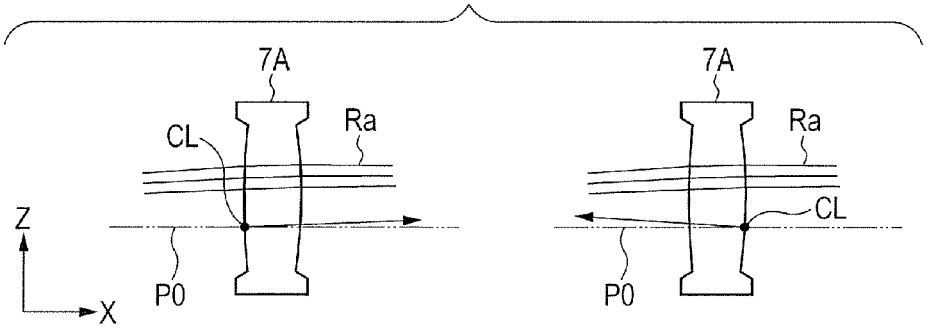
FIG. 12C is an enlarged view of a portion near the imaging optical element 7A of the conventional oblique incident optical system.
Figure 13:
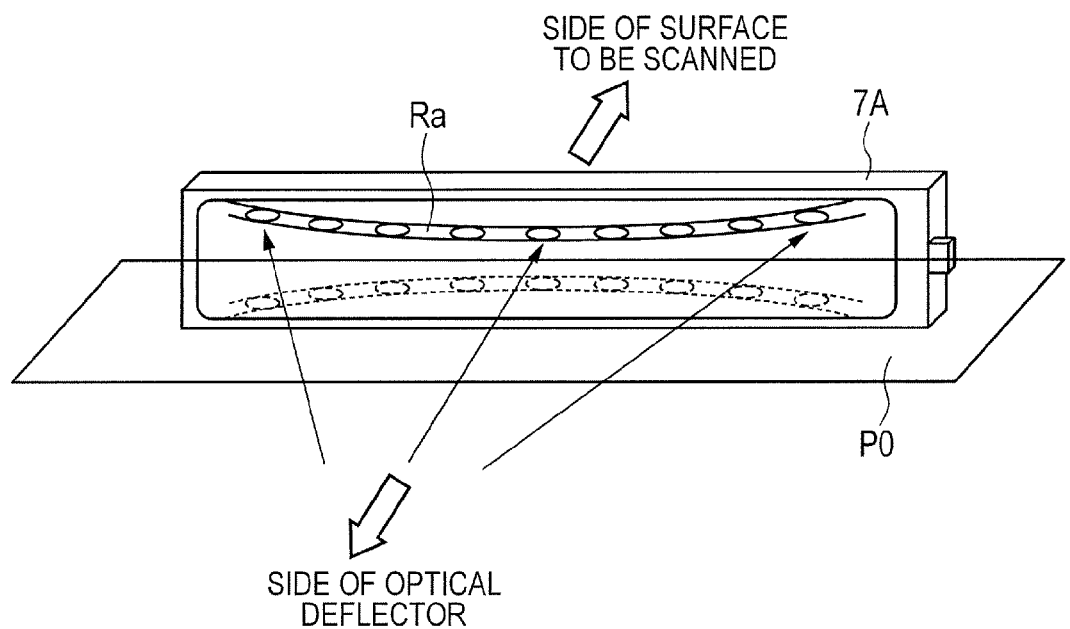
FIG. 13 is a view for illustrating the scanning locus of a light beam on the lens surface of the conventional oblique incident optical system.

FIG. 11 is a schematic view of the main parts of a color image forming apparatus 60 including an optical scanning apparatus 12 according to an embodiment of the present invention. The image forming apparatus 60 is a tandem-type color image forming apparatus that records image information on the photosensitive surfaces of photosensitive drums 21, 22, 23, and 24 each serving as an image carrier arranged on the surface to be scanned.

Referring to FIG. 11, an external device 52 such as a personal computer inputs R (red), G (green), and B (blue) color signals to the color image forming apparatus 60. A printer controller 53 in the apparatus converts the color signals into C (cyan), M (magenta), Y (yellow), and B (black) image data (dot data). These image data are input to the optical scanning apparatus 12. The optical scanning apparatus 12 emits light beams 41, 42, 43, and 44 modulated in accordance with the image data. These light beams scan the photosensitive surfaces of the photosensitive drums 21, 22, 23, and 24 in the main scanning direction.

As described above, in the color image forming apparatus 60, the optical scanning apparatus 12 forms the latent images of the respective colors on the photosensitive surfaces of the corresponding photosensitive drums 21, 22, 23, and 24 using the light beams based on the respective image data. After that, developers 31, 32, 33, and 34 develop the latent images of the respective colors into toner images. Transfer devices (not shown) transfer the toner images of the respective colors to a transfer material conveyed by a conveyor belt 51. Fixers (not shown) fix the transferred toner images to the transfer material, thereby forming one full-color image.

As the external device 52, for example, a color image reading apparatus including a CCD sensor may be used. In this case, a color digital copying machine is formed by the color image reading apparatus and the color image forming apparatus 60. Note that the color image forming apparatus may arrange the photosensitive drums 21, 22, 23, and 24 above the optical scanning apparatus 12. In this case as well, the color image forming apparatus can be made compact.

Optical Scanning Apparatus

Figure 1A:
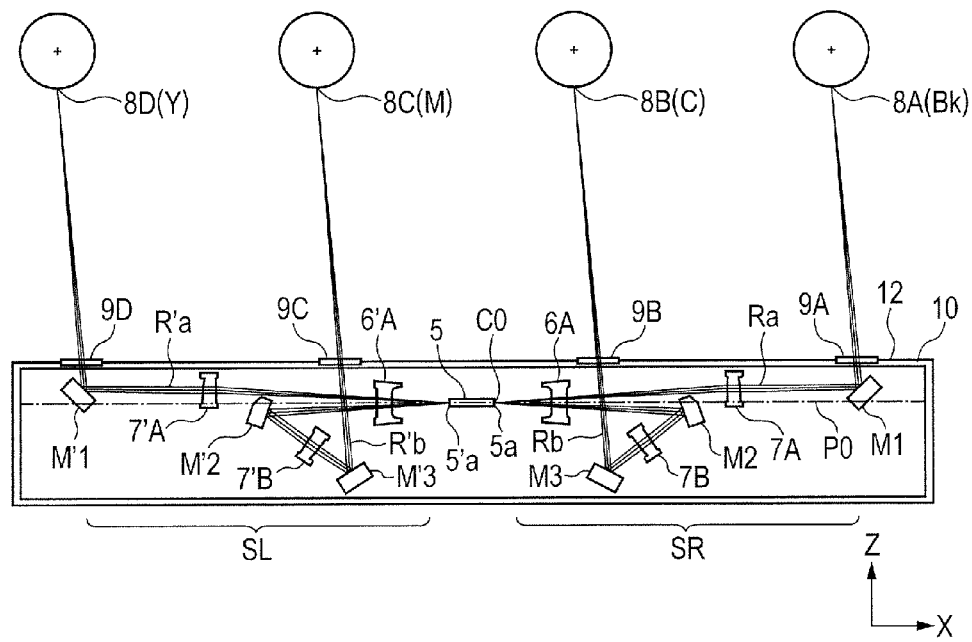
FIG. 1A is a sub-scanning sectional view of an optical scanning apparatus according to the first embodiment of the present invention.
Figure 1B:
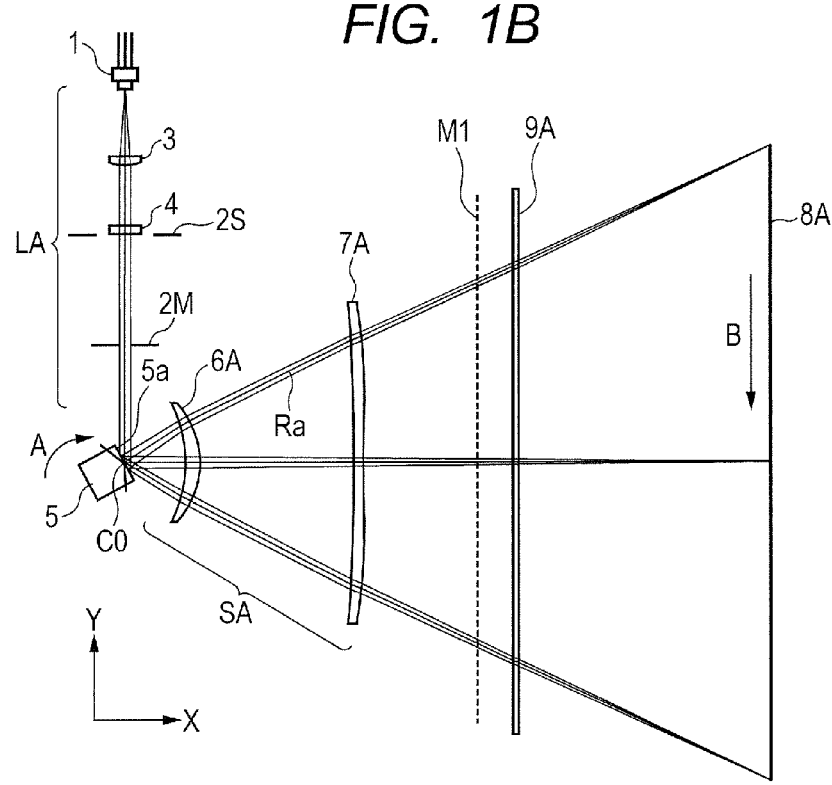
FIG. 1B is a main scanning sectional view of the optical scanning apparatus according to the first embodiment of the present invention.
Figure 1C:
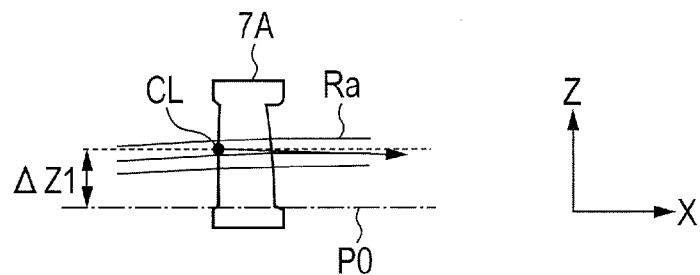
FIG. 1C is an enlarged sub-scanning sectional view of the incident surface of an imaging optical element 7A of the optical scanning apparatus according to the first embodiment of the present invention.
Figure 1D:
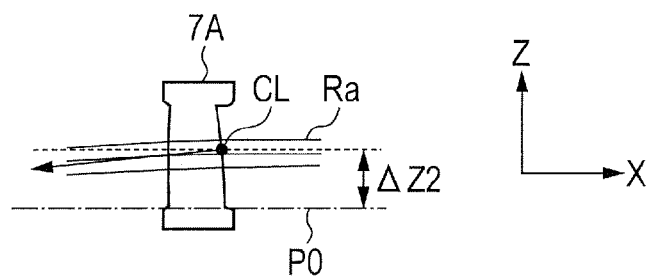
FIG. 1D is an enlarged sub-scanning sectional view of the exit surface of the imaging optical element 7A of the optical scanning apparatus according to the first embodiment of the present invention.
Figure 1E:
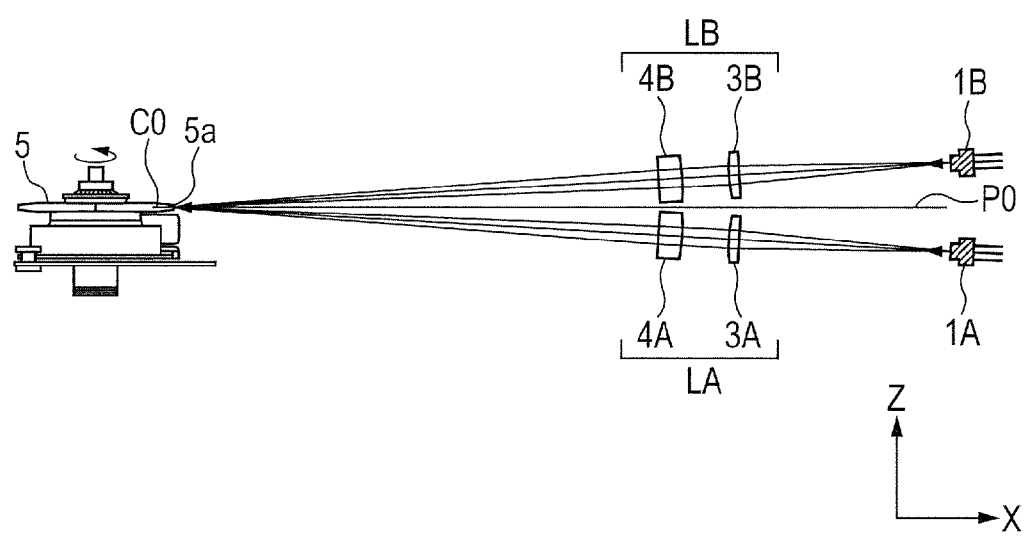
FIG. 1E is a sub-scanning sectional view of the incident optical system of the optical scanning apparatus according to the first embodiment of the present invention.

FIG. 1A is a sub-scanning sectional view of the optical scanning apparatus according to the first embodiment of the present invention. FIG. 1B is a main scanning sectional developed view of an imaging optical system that condenses a light beam (scanning light beam) onto a surface 8A (photosensitive surface) to be scanned. FIGS. 1C and 1D are enlarged sub-scanning sectional views of the incident surface and the exit surface of an imaging optical element 7A optically closest to the surface 8A to be scanned. Note that "optically closest to the surface to be scanned" indicates "optically closest to the surface to be scanned when the optical system is illustrated with its optical path developed". FIG. 1E is an enlarged sub-scanning sectional view of an incident optical system that makes a light beam obliquely enter the deflecting surface of a deflector.

Note that in the following explanation of the embodiment, the optical axis (on-axis) of the imaging optical system indicates an axis that passes the center of the surface to be scanned and is perpendicular to the surface to be scanned. The sub-scanning direction (Z-direction) is a direction parallel to the rotation axis of the deflector. The main scanning section is a section having a normal in the sub-scanning direction. The main scanning direction (Y-direction) is a direction in which the light beam deflected for scanning by the deflector is projected to the main scanning section. The sub-scanning section is a section having a normal in the main scanning direction.

Referring to FIG. 1B, a light source 1 is formed from, for example, a semiconductor laser. A collimator lens 3 converts a divergent light beam emitted by the light source 1 into substantially collimated light in the main scanning section. A cylinder lens 4 forms, in the sub-scanning section, an image of the light beam from the collimator lens 3 on a deflecting surface 5a of a deflector 5 as a line image long in the main scanning direction. The deflector 5 is a polygon mirror including four deflecting surfaces and having a circumradius of 10 mm. The deflector 5 is rotated by a driving unit (not shown) in the direction of an arrow A in FIG. 1B at a predetermined speed.

A sub-scanning aperture 2S restricts the beam diameter in the sub-scanning direction. A main scanning aperture 2M restricts the beam diameter in the main scanning direction. The diameter of the light beam from the light source 1 is restricted by the two apertures so as to form a desired spot shape ($1/e^2$ slice diameter of the peak light amount of the spot) on the surface to be scanned. Note that the sub-scanning aperture 2S, the main scanning aperture 2M, the collimator lens 3, and the cylinder lens 4 constitute an incident optical system LA.

As shown in FIG. 1E, in this embodiment, two light beams from semiconductor lasers 1A and 1B each serving as the light source 1 are deflected by the same deflecting surface 5a of the deflector 5. More specifically, first, collimator lenses 3A and 3B convert the divergent light beams emitted by the semiconductor lasers 1A and 1B into substantially collimated light beams, respectively. The light beams from the collimator lenses 3A and 3B are condensed near the same deflecting surface 5a of the deflector 5 through cylinder lenses 4A and 4B, respectively, in the sub-scanning section. The deflector 5 is commonly used in correspondence with the plurality of light sources in the above-described way. This allows to decrease the number of component types and increase the number of produced components per type, thereby achieving the mass production effect. Note that the semiconductor lasers 1A and 1B may be integrated so that the light source 1 includes a plurality of light-emitting portions.

The optical scanning apparatus according to this embodiment includes two scanning units SR and SL on both sides of the deflector 5. The single deflector 5 deflects four light beams Ra, Rb, R'a, and R'b for scanning to scan corresponding photosensitive drum surfaces 8A (Bk), 8B (C), 8C (M), and 8D (Y).

In the scanning unit SR, the light beam Ra deflected for scanning by the deflecting surface 5a of the deflector 5 passes through imaging optical elements 6A and 7A and is then reflected by a reflecting mirror M1 and guided to the surface 8A (Bk) to be scanned. The light beam Rb deflected for scanning by the deflecting surface 5a of the deflector 5 passes through the imaging optical element 6A, is reflected by a reflecting mirror M2, and passes through an imaging optical element 7B. The light beam Rb is then reflected by a reflecting mirror M3, crosses the light beam of itself that has passed through the imaging optical element 6A in the sub-scanning section, and reaches a surface 8B (C) to be scanned.

In the scanning unit SL as well, the optical paths are led in the same way as in the scanning unit SR. The light beam R'a deflected for scanning by a deflecting surface 5'a of the deflector 5 passes through imaging optical elements 6'A and 7'A and is then reflected by a reflecting mirror M'1 and guided to a surface 8D (Y) to be scanned. The light beam R'b deflected for scanning by the deflecting surface 5'a of the deflector 5 passes through the imaging optical element 6'A, is reflected by a reflecting mirror M'2, and passes through an imaging optical element 7'B. The light beam is then reflected by a reflecting mirror M'3 and guided to a surface 8C (M) to be scanned.

Note that the optical systems that form images on the surfaces 8A and 8D to be scanned which are the optically farthest from the deflector 5 will be referred to as imaging optical systems SA and SD, respectively. The optical systems that form images on the surfaces 8B and 8C to be scanned which are the optically closest to the deflector 5 will be referred to as imaging optical systems SB and SC, respectively.

Since the two scanning units SR and SL according to this embodiment have the same arrangement and optical function, the scanning unit SR will be described below. Each of the imaging optical systems SA and SB according to this embodiment includes a plurality of imaging optical elements. The imaging optical element 6A which is the closest to the deflector 5 is shared by the imaging optical systems SA and SB. Each of the imaging optical elements 7A and 7B which are the closest to the surfaces to be scanned employs a decentered lens whose thickness changes between one end side in the widthwise direction (sub-scanning direction) and the opposing other end side, thereby achieving reduction of the size and cost of the lens. Hence, the imaging optical elements 7A and 7B used in the scanning unit SR and the imaging optical elements 7'A and 7'B used in the scanning unit SL use lenses having different shapes.

In this embodiment, the imaging optical system SB that forms an image on the surface 8B to be scanned which is the closest to the deflector 5 includes two reflecting mirrors in a minimum necessary number. In the imaging optical system SA, the imaging optical element 7A is arranged on a side of the deflector 5 from the reflecting mirror M1. This shortens the main scanning direction length of the imaging optical element 7A. These optical design value and arrangement allow to reduce both the cost and size of the apparatus using a minimum necessary number of components. C0 in the drawings indicates the deflection reflecting point (reference point) of the principal ray of the on-axis light beam. In the sub-scanning section, the light beams Ra and Rb cross at the deflection reflecting point C0. The deflection reflecting point C0 serves as the reference point of the arrangement of each imaging optical system.

Origin Position of Lens Surface and Tilt of Lens Surface in Sub-Scanning Section FIG. 1C is a view showing an origin position CL of the incident surface of the imaging optical element 7A in the sub-scanning section and the tilt direction of the surface. Note that the origin position indicates here the position of the origin of an aspherical surface formula (to be described later in detail) defining the surface shape of the incident surface of the imaging optical element 7A in the sub-scanning section including the optical axis of the imaging optical system. The origin position CL of the incident surface is shifted from a plane P0 by ΔZ1 in the sub-scanning direction. The plane normal at that position is tilted in the direction indicated by the arrow. Similarly, FIG. 1D is a view showing the origin position CL of the exit surface of the imaging optical element 7A in the sub-scanning section and the tilt direction of the surface. In this embodiment, $\Delta Z1$ equals $\Delta Z2$, and $\Delta Z1=\Delta Z2=4.348$. However, $\Delta Z1$ and $\Delta Z2$ may be different values.

Figure 2A:
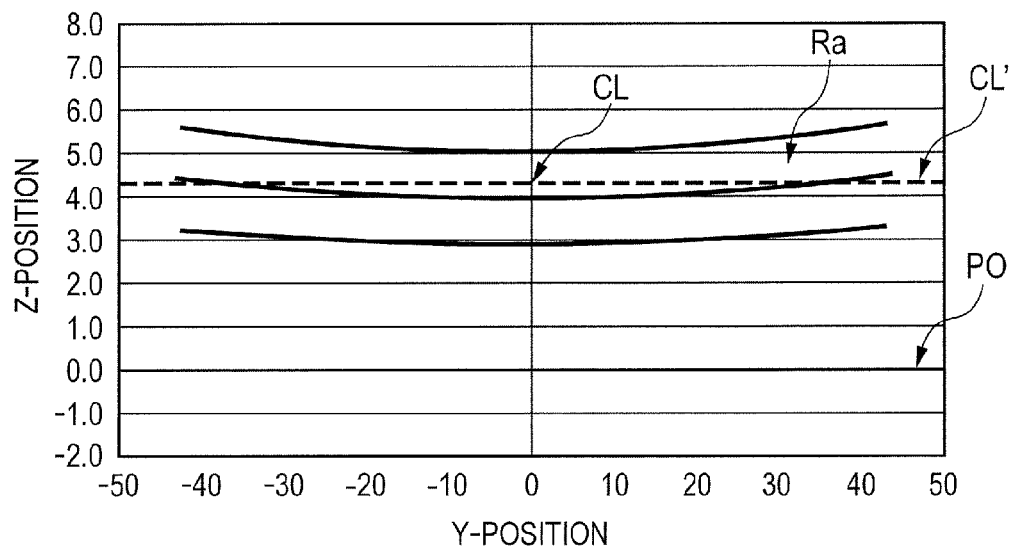
FIG. 2A is a view for illustrating the scanning locus of a light beam on the incident surface of the imaging optical element 7A.
Figure 2B:
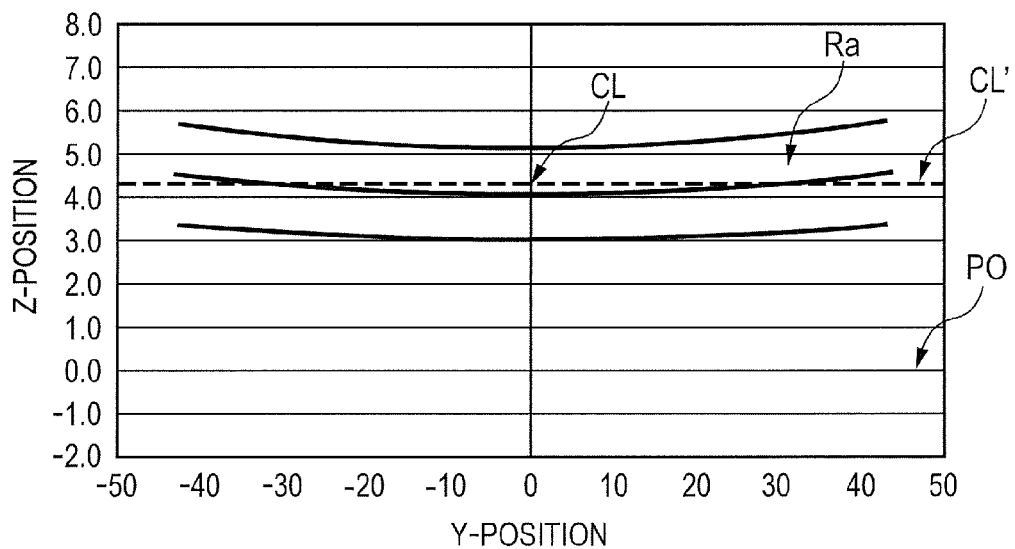
FIG. 2B is a view for illustrating the scanning locus of a light beam on the exit surface of the imaging optical element 7A.

FIG. 2A is a view showing the relationship between the locus of a scanning light beam on the incident surface of the imaging optical element 7A and an origin position line CL' passing through the origin position CL on the incident surface and extended in the main scanning direction. FIG. 2A illustrates three lines indicating the loci of the principal ray of the scanning light beam and the marginal rays at two ends in the sub-scanning direction. Similarly, FIG. 2B shows the relationship between the locus of a scanning light beam on the exit surface of the imaging optical element 7A and the origin position line CL'. As illustrated, the imaging optical element 7A according to this embodiment is designed to place the origin position line CL' in the region sandwiched between the marginal rays at the two ends of the scanning light beam in the sub-scanning direction on both the incident surface and the exit surface. This allows to easily evaluate optical performance and increase the accuracy of the lens surface shape when molding the imaging optical element 7A using a mold. In addition, the origin position line CL' is set across the principal ray of the scanning light beam. This allows to further increase the accuracy of the lens surface shape upon molding using a mold.

The incident surface and the exit surface of the imaging optical element 7A are optically designed using the aspherical surface formula to be described below so as to satisfy each optical performance. In particular, to set the above-described relationship between the locus of the scanning light beam and the origin position line CL', the incident surface and the exit surface of the imaging optical element 7A are decentered in the sub-scanning section including the optical axis of the imaging optical system. Tables 1 and 2 show the optical arrangement of the optical scanning apparatus and the lens surface shapes in the optical systems according to this embodiment.

TABLE 1

| Light source wavelength | λ (nm) | 790 |
|---|---|---|
| refractive index of collimator lens 3 | n3 | 1.76167 |
| refractive index of cylinder lens 4 | n4 | 1.52397 |
| refractive index of imaging lens 6A | n6A | 1.52397 |

TABLE 1-continued

| refractive index of imaging lens 7A | n7A | 1.52397 |
|---|---|---|
| sub-scanning aperture | | 2.160 |
| main scanning aperture | | 3.600 |
| angle (degree) of oblique incidence of laser in main scanning direction | | 89.5 |
| angle (degree) of oblique incidence of laser in sub-scanning direction | | −3 |
| maximum exit angle (degree) of ray | | 32.437 |
| coordinates (mm) of rotation center of polygon mirror | X direction | −5.579 |
| | Y direction | −4.416 |
| number of surfaces of polygon mirror | | 4 |
| circumscribed circle diameter (mm) of polygon mirror | | φ20 |
| effective scanning width | W | 214 |
| Kθ coefficient | K (rad/mm) | 189 |

Optical arrangement

| | X direction | Y direction | Z direction |
|---|---|---|---|
| light source 1 | 1.104 | 126.552 | −6.633 |
| incident surface of collimator lens 3 | 0.901 | 103.244 | −5.411 |
| exit surface of collimator lens 3 | 0.875 | 100.249 | −5.254 |
| incident surface of cylinder lens 4 | 0.696 | 79.738 | −4.179 |
| exit surface of cylinder lens 4 | 0.696 | 76.742 | −4.022 |
| sub-scanning aperture 2S | 0.670 | 76.742 | −4.022 |
| main scanning aperture 2M | 0.349 | 39.944 | −2.093 |
| on-axis deflection point C0 | 0.000 | 0.000 | 0.000 |
| incident surface of imaging lens 6A | 20.000 | 0.160 | 0.000 |
| exit surface of imaging lens 6A | 25.000 | 0.160 | 0.000 |
| incident surface of imaging lens 7A | 76.500 | 0.160 | 4.348 |
| exit surface of imaging lens 7A | 80.500 | 0.160 | 4.348 |
| incident surface of dust-proof glass 9A | 130.121 | 0.160 | 0.000 |
| exit surface of dust-proof glass 9A | 131.921 | 0.160 | 0.000 |
| surface 8A to be scanned | 217.210 | 0.160 | 0.000 |

TABLE 2 lens shape data

| | collimator | | cylinder lens | | imaging lens | | imaging lens 7A | |
|---|---|---|---|---|---|---|---|---|
| | incide | exit | incide | exit | incide | exit | inciden | exit surface |
| | | | | main scanning direction | | | | |
| R | ∞ | — | ∞ | ∞ | — | — | — | 4.40776E+03 |
| K | | | | | 2.3825 | — | | 1.72444E+01 |
| B4 | | | | | 1.8510 | — | | −7.94656E−07 |
| B6 | | | | | 4.8344 | 1.8184 | | 1.75850E−10 |
| B8 | | | | | — | — | | −3.62924E−14 |
| B1 | | | | | 1.9916 | — | | 3.95244E−18 |
| B4 | | | | | 1.8510 | — | | −7.94656E−07 |
| B6 | | | | | 4.8344 | 1.8184 | | 1.75850E−10 |
| B8 | | | | | — | — | | −3.62924E−14 |
| B1 | | | | | 1.9916 | — | | 3.95244E−18 |

TABLE 2-continued

| | lens shape data | | | | | | | |
|---|---|---|---|---|---|---|---|---|
| | collimator | | cylinder lens | | imaging lens | | imaging lens 7A | |
| | incide | exit | incide | exit | incide | exit | inciden | exit surface |
| | sub-scanning direction | | | | | | | |
| Rs | ∞ | — | 5.8620 | ∞ | 2.5000 | 2.5000 | 6.77042 | −3.96920E+01 |
| C3 | | | | — | | | | |
| D2 | | | | | | — | | 1.93647E−04 |
| D4 | | | | | | 1.1599 | | −2.88008E−08 |
| D6 | | | | | | — | | −2.42773E−12 |
| D8 | | | | | | 5.9377 | | 7.51862E−15 |
| D1 | | | | | | — | | −1.88312E−18 |
| D2 | | | | | | — | | 2.00919E−14 |
| D4 | | | | | | 1.7928 | | −8.97607E−09 |
| D6 | | | | | | — | | −3.56175E−11 |
| D8 | | | | | | 2.6539 | | 3.08916E−14 |
| D1 | | | | | | — | | −7.67333E−18 |
| M0 | | | | | | | 5.94719 | −9.10000E−02 |
| M1 | | | | | | | 5.33126 | 4.19533E−05 |
| M2 | | | | | | | 3.66915 | 4.63618E−05 |
| M3 | | | | | | | 3.17055 | 2.63210E−07 |
| M4 | | | | | | | — | −4.31205E−08 |
| M5 | | | | | | | 6.80412 | 6.03398E−11 |
| M6 | | | | | | | 2.46411 | 2.50770E−11 |
| M7 | | | | | | | — | −1.56085E−13 |
| M8 | | | | | | | — | −6.56057E−15 |
| M9 | | | | | | | 1.13831 | 6.12653E−17 |
| M1 | | | | | | | — | 3.53900E−20 |
| M1 | | | | | | | — | −1.16976E−21 |
| M1 | | | | | | | 5.54400 | 1.42449E−22 |
| M1 | | | | | | | — | −2.16454E−24 |
| M0 | | | | | | | | −3.25056E−05 |
| M1 | | | | | | | | 3.90324E−07 |
| M2 | | | | | | | | 1.80524E−08 |
| M3 | | | | | | | | 2.94091E−10 |
| M4 | | | | | | | | 8.75123E−12 |
| M5 | | | | | | | | −1.55063E−13 |
| M6 | | | | | | | | −3.92266E−15 |

In the cylinder lens 4 according to this embodiment, the incident surface is a refracting surface having a power only in the sub-scanning section, and the exit surface is a diffraction surface having a diffraction grating formed on a plane. The cylinder lens 4 is molded by injection molding using a plastic material and forms a so-called temperature compensated optical system that compensates for a change in the refracting power caused by an environmental variation by a change in the diffraction power caused by a wavelength change in the semiconductor laser.

The exit surface (diffraction surface) of the cylinder lens 4 is defined by a phase function given by the following equation (1).

$$\phi = 2\pi M / \lambda (C_3 Z^2 + C_5 Y^2) \quad (1)$$

where $\phi$ is the phase function, and M is the order of diffraction. In this embodiment, 1st-order diffraction light (M=1) is used. $\lambda$ is the design wavelength. In this embodiment, $\lambda$=790 nm. Each of the incident surfaces and the exit surfaces of the imaging optical elements 6A and 7A has an aspherical shape (meridian line shape) expressible as a function up to 10th order in the main scanning section passing through the origin. In each of the imaging optical elements 6A and 7A, the intersection between the lens surface and the optical axis is defined as the origin, the axis in the optical axis direction as the X-axis, and the axis perpendicular to the X-axis in the main scanning section as the Y-axis. At this time, the meridian line shape of each lens surface of the imaging optical elements 6A and 7A is given by the following equation (2).

$$X = \frac{Y^2/R}{1 + \left(1 - (1+K)(Y/R)^2\right)^{1/2}} + B_4 Y^4 + B_6 Y^6 + B_8 Y^8 + B_{10} Y^{10} \quad (2)$$

where R is the radius of curvature (the radius of curvature of the meridian line) in the main scanning section, and K, $B_4$, $B_6$, $B_8$, and $B_{10}$ are aspherical coefficients. The values of the aspherical coefficients $B_4$, $B_6$, $B_8$, and $B_{10}$ can be changed between a side of the optical axis of the imaging optical system where the semiconductor laser 1 is arranged ($B_{4U}$, $B_{6U}$, $B_{8U}$, and $B_{10U}$) and a side where the semiconductor laser 1 is not arranged ($B_{4L}$, $B_{6L}$, $B_{8L}$, and $B_{10L}$). This allows to make the imaging optical elements 6A and 7A asymmetrical in the main scanning direction with respect to the optical axis. A shape (sagittal line shape) S of each lens surface of the imaging optical elements 6A and 7A in the sub-scanning section is given by the following equation (3).

$$S = \frac{Z^2/Rs^*}{1 + \left(1 - (Z/Rs^*)^2\right)^{1/2}} + (\Sigma M_{i,1} Y^i) Z + (\Sigma M_{i,A} Y^i) Z^4 \quad (3)$$

A radius of curvature (a radius of curvature of the sagittal line) $Rs^*$ in the sub-scanning section at a position far apart by Y from the optical axis in the main scanning direction is given by the following equation (4).

$$Rs^* = Rs(1 + D_2 \times Y^2 + D_4 \times Y^4 + D_6 \times Y^6 + D_8 \times Y^8 + D_{10} \times Y^{10}) \quad (4)$$

(where Rs is the radius of curvature of the sagittal line on the optical axis, and $D_2$, $D_4$, $D_6$, $D_8$, and $D_{10}$ are sagittal line change coefficients)

Like equation (2) described above, when the values of the aspherical coefficients $D_2$ to $D_{10}$ are changed between a side of the optical axis of the imaging optical system where the semiconductor laser 1 is arranged ($D_{2U}$ to $D_{10U}$) in the optical scanning apparatus and a side where the semiconductor laser 1 is not arranged ($D_{2L}$ to $D_{10L}$), the imaging optical elements 6A and 7A can be asymmetrical in the main scanning direction.

The second term of equation (3) is a term that is formed from a linear function of Z and gives the tilt amount in the sagittal line direction, and the third term is a term that is formed from a quartic function of Z and gives a non-arc shape as the non-arc amount in the sagittal line direction. In this embodiment, an odd-order term of Y is given for the tilt amount of the sagittal line and the non-arc amount of the sagittal line, thereby expressing the shape aspherical in the main scanning direction. Both the incident surface and the exit surface of the imaging optical element 7A are sagittal line tilt change surfaces. Only the exit surface is the non-arc surface of the sagittal line (non-arc surface in the sub-scanning section). Note that in this embodiment, each lens surface shape is defined by a function like the above-described equations. However, the present invention is not limited to this.

Figure 3:
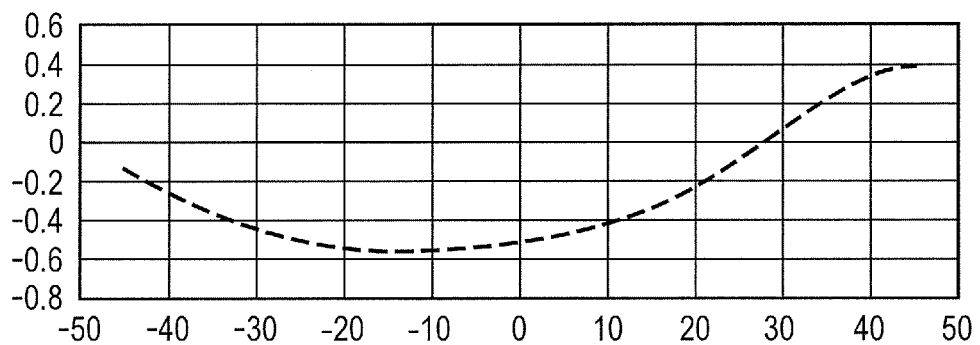
FIG. 3 is a view for illustrating the non-arc amount of the sagittal line on the exit surface of the imaging optical element 7A.

FIG. 3 is a graph that plots the non-arc amount of each lens surface of the imaging optical element 7A according to this embodiment along the abscissa representing the position in the main scanning direction.

Figure 4:
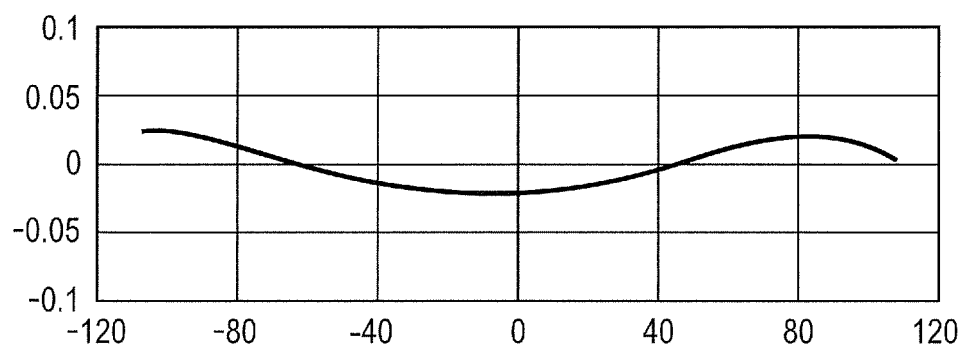
FIG. 4 is a view for illustrating the sub-scanning direction coma of the optical system according to the first embodiment.

FIG. 4 is a graph that plots the coma (wave aberration, unit: $\lambda$) in the sub-scanning direction along the abscissa representing the image height position of the surface to be scanned. As can be seen from these graphs, even when the non-arc amount of the sagittal line is introduced to each lens surface, the coma in the sub-scanning direction can be suppressed to 0.05$\lambda$ or less at all image height positions.

Figure 5:
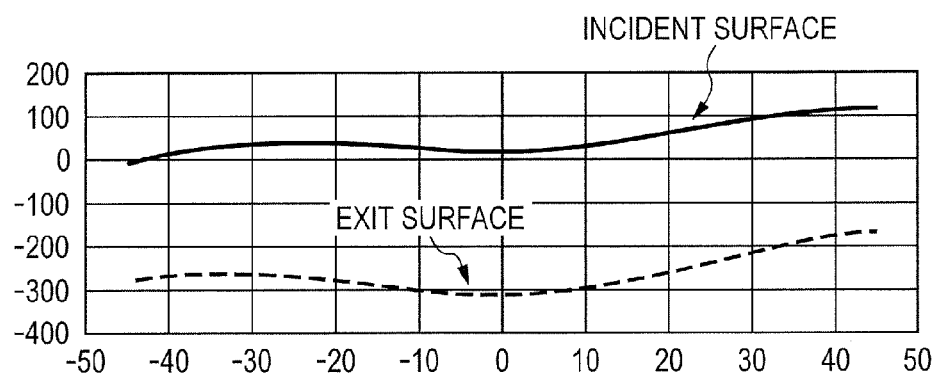
FIG. 5 is a view for illustrating changes in the tilt amount of the sagittal line on the incident and exit surfaces of the imaging optical element 7A.

FIG. 5 is a graph that plots the tilt amount of the sagittal line on the incident surface and the exit surface of the imaging optical element 7A along the abscissa representing the position in the main scanning direction. When the tilt amount is given from above the optical axis and changed in the main scanning direction, spot distortion caused by twist of wave aberration and bending of the scanning line on the surface (photosensitive surface) to be scanned are suppressed.

Figure 6:
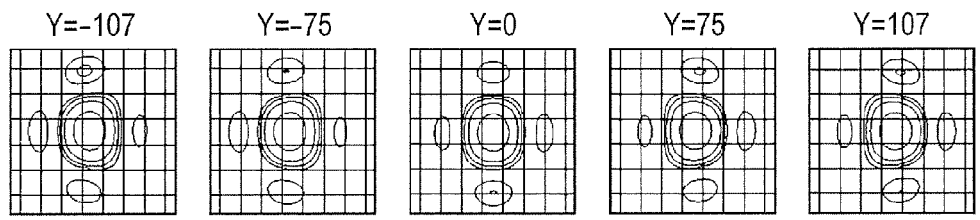
FIG. 6 is a view for illustrating a spot shape according to the first embodiment.

FIG. 6 shows spot shapes at the respective image height positions on the surface to be scanned (defocus zero). Contour lines indicate 2%, 5%, 13.5%, and 50% of the peak light amount, respectively, from the outside. As shown in FIG. 6, the spots have a neat shape because the wave aberration has been corrected. As for the bending of the scanning line on the surface to be scanned, the difference between the maximum value and the minimum value is as small as 0.4 μm at all image heights, although not illustrated.

As described above, the imaging optical element 7A according to this embodiment is decentered in the sub-scanning section including the optical axis of the imaging optical system such that the origin position line on each lens surface exists in the region sandwiched between the marginal rays at the two ends of the scanning light beam in the sub-scanning direction. In addition, the origin position line on each lens surface is set across the principal ray of the scanning light beam on each lens surface of the imaging optical element. This allows to make the locus of the light beam and the origin position line on each lens surface closer. Hence, when molding the imaging optical element using a mold, it is possible to achieve more accurate mold correction and reduction of the number of times of correction and accurately evaluate the optical performance of each lens surface. This enables to further increase the lens surface molding accuracy. In addition, even when each lens surface has the non-arc amount of the sagittal line, the coma in the sub-scanning direction can be suppressed, and an excellent spot shape can be obtained.

Using a decentered lens without any wasteful mirror surface portion that does not pass the scanning light beam allows to reduce the lens material cost and attain a compact and inexpensive imaging optical element. In addition, using this imaging optical element allows to increase the degree of freedom in leading the optical path of the optical scanning apparatus and also make the optical scanning apparatus compact. Note that in this embodiment, the imaging optical system is formed from two imaging optical elements. However, the present invention is not limited to this, and the imaging optical system may be formed from three or more imaging optical elements.

In this embodiment, the lens surfaces of the imaging optical element 7A that is the optically closest to the surface to be scanned out of the plurality of imaging optical elements included in the imaging optical system are decentered. The farther the imaging optical element is optically apart from the deflecting surface, and the closer the imaging optical element is to the surface to be scanned, the farther the scanning light beam passing position on each lens surface is apart from the origin position line. For this reason, the imaging optical element 7A having the above-described arrangement can obtain a larger effect. However, the present invention is not limited to this. The effect can be obtained when at least one of the incident surface and the exit surface of at least one imaging optical element out of the plurality of imaging optical elements included in the imaging optical system is decentered as described above. For example, a lens surface of the imaging optical element 6A may be decentered in the sub-scanning section including the optical axis of the imaging optical system such that the origin position line exists in the region sandwiched between the marginal rays at the two ends of the scanning light beam in the sub-scanning direction.

Manufacturing Method

The steps in the manufacture of an imaging optical element included in the imaging optical system will be described. First, a mold is manufactured based on the design value of the imaging optical element. Next, optical performance evaluation is performed at the light beam passing position in at least one of the incident surface and the exit surface of the imaging optical element. The mold is corrected based on the result of the optical performance evaluation, and the imaging optical element is molded using the corrected mold.

In the optical performance evaluation, evaluation is performed concerning the shape of each lens surface in the main scanning section. To perform this evaluation, the meridian line shape and the radius of curvature of the sagittal line of the lens surface are accurately measured. If the lens surface is a sagittal line tilt surface, the tilt amount is accurately measured. If the lens surface has a non-arc shape (the non-arc shape of the sagittal line) in the sub-scanning section, the non-arc amount of the sagittal line is accurately measured. The lens surface shape at the light beam passing position is calculated from these measurement results. The focus position, the bending of the scanning line, and the like on the surface to be scanned, which are optically simulated from the calculated lens surface shape can be made to match the focus position, the bending of the scanning line, and the like, which are actually optically measured.

Second Embodiment

Figure 7A:
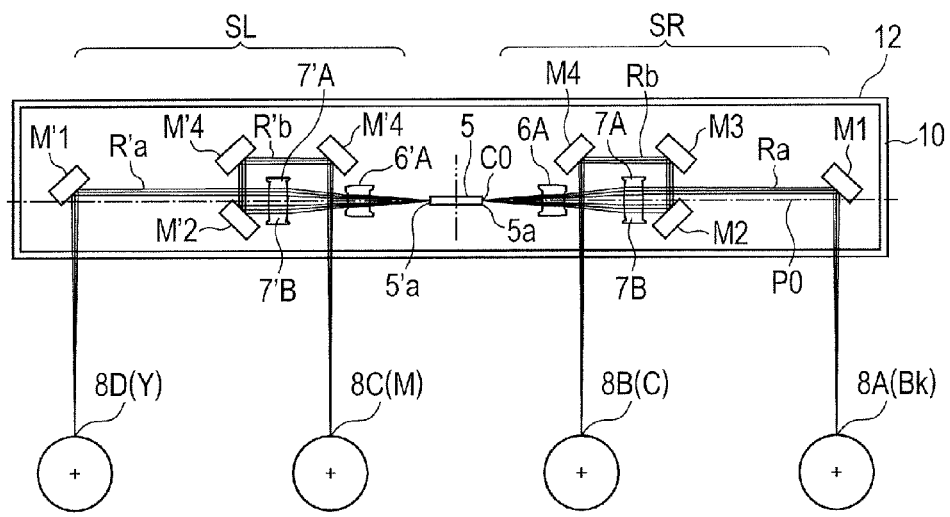
FIG. 7A is a sub-scanning sectional view of an optical scanning apparatus according to the second embodiment of the present invention.
Figure 7B:
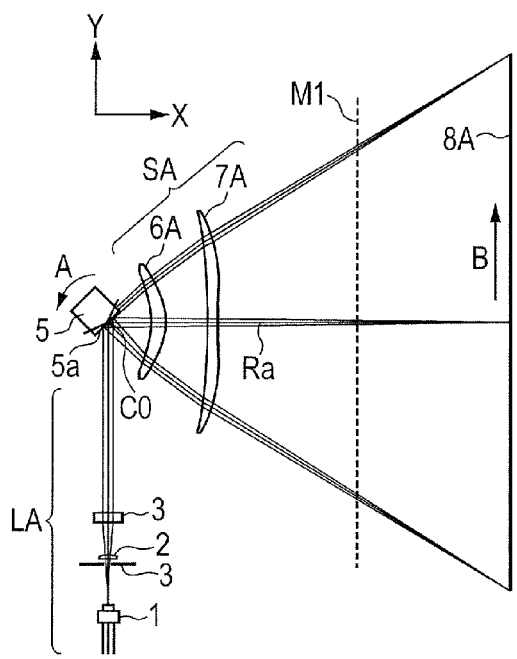
FIG. 7B is a main scanning developed view of the optical scanning apparatus according to the second embodiment of the present invention.
Figure 7C:
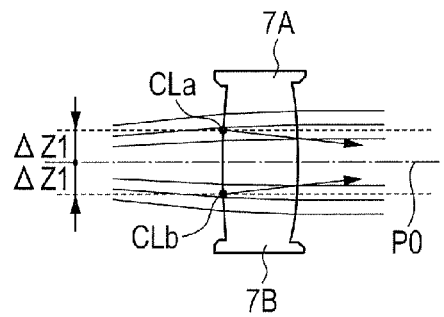
FIG. 7C is an enlarged sub-scanning sectional view of the incident surfaces of imaging optical elements 7A and 7B of the optical scanning apparatus according to the second embodiment of the present invention.
Figure 7D:
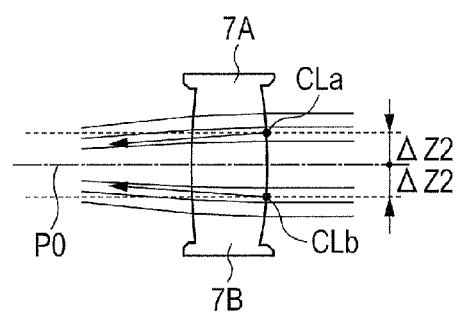
FIG. 7D is an enlarged sub-scanning sectional view of the exit surfaces of the imaging optical elements 7A and 7B of the optical scanning apparatus according to the second embodiment of the present invention.

FIG. 7A is a sub-scanning sectional view of an optical scanning apparatus according to the second embodiment of the present invention. FIG. 7B is a main scanning section developed view of an imaging optical system that condenses a light beam (scanning light beam) on a surface (photosensitive surface) 8A to be scanned. FIGS. 7C and 7D are enlarged sub-scanning sectional views of portions near imaging optical elements 7A and 7B optically closest to the surface 8A to be scanned. In this embodiment, the imaging optical elements 7A and 7B are integrated by molding to form a multi-stage lens, as can be seen from these drawings. This allows to decrease the number of lenses and reduce the cost.

In this embodiment, each of the optical paths toward surfaces 8B and 8C to be scanned is turned by three reflecting mirrors, and the imaging optical elements are formed as multi-stage lenses, as described above, unlike the first embodiment. The rest is the same as in the first embodiment. FIG. 7C is a view showing an origin position CLa of the incident surface of the imaging optical element 7A and the tilt direction of the surface and an origin position CLb of the incident surface of the imaging optical element 7B and the tilt direction of the surface. On the incident surface, positions shifted from a plane P0 described above by $\Delta Z1$ in the sub-scanning direction are defined as the origin positions CLa and CLb of the aspherical surface formula. The plane normals at the positions are tilted in directions indicated by the arrows.

Similarly, FIG. 7D is a view showing the origin position CLa of the exit surface of the imaging optical element 7A and the tilt direction of the surface and the origin position CLb of the exit surface of the imaging optical element 7B and the tilt direction of the surface. In this embodiment, $\Delta Z1 = \Delta Z2 = 2.24$.

Figure 8A:
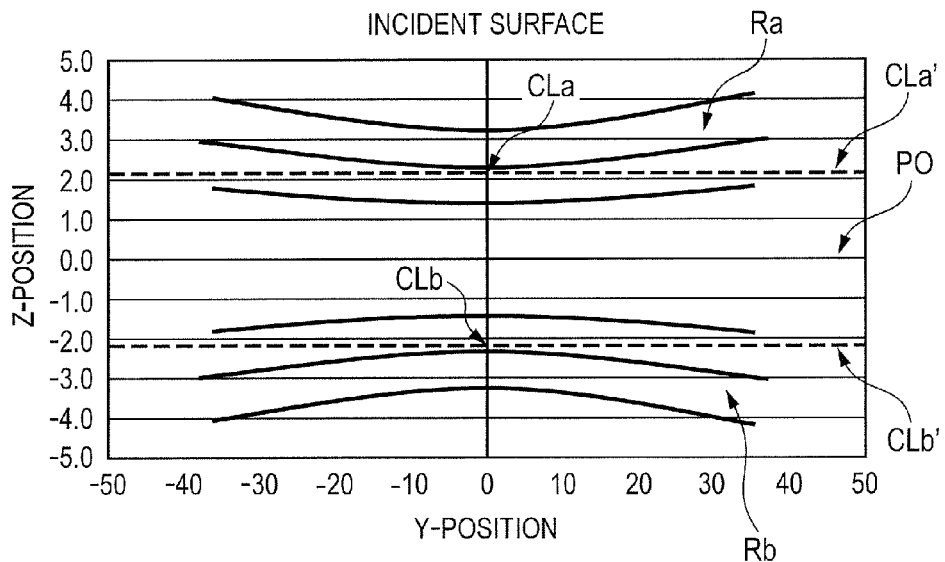
FIG. 8A is a view for illustrating the scanning loci of light beams on the incident surfaces of the imaging optical elements 7A and 7B.
Figure 8B:
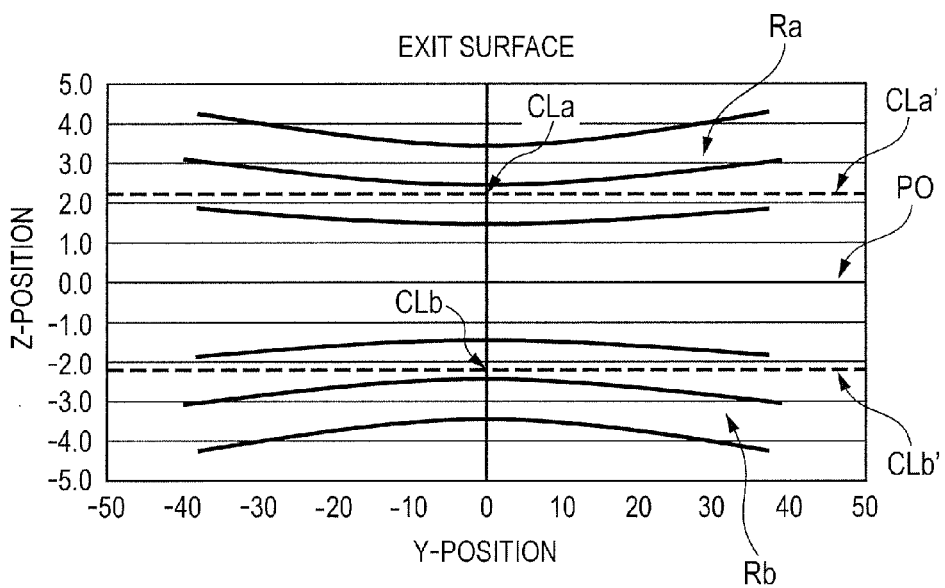
FIG. 8B is a view for illustrating the scanning loci of light beams on the exit surfaces of the imaging optical elements 7A and 7B.

FIG. 8A is a view showing the relationship between the locus of a scanning light beam on the incident surfaces of the imaging optical elements 7A and 7B and origin position lines CLa' and CLb'. In the scanning locus, three rays including the principal ray of the light beam and the marginal rays at the two end in the sub-scanning direction are illustrated on the upper and lower sides. Similarly, FIG. 8B shows the relationship between the locus of the scanning light beam on the exit surfaces of the imaging optical elements 7A and 7B and the origin position lines CLa' and CLb'.

The imaging optical elements 7A and 7B according to this embodiment are designed to place the origin position lines CLa' and CLb' in the region sandwiched between the marginal rays at the two ends of the scanning light beam in the sub-scanning direction on both the incident surface and the exit surface. Tables 3 and 4 show the optical arrangement of the optical scanning apparatus and the lens surface shapes in the optical systems according to this embodiment.

TABLE 3

| | | |
|---|---|---|
| Light source wavelength | λ (nm) | 790 |
| refractive index of collimator lens 3 | n3 | 1.52397 |
| refractive index of cylinder lens 4 | n4 | 1.52397 |
| refractive index of imaging lens 6A | n6A | 1.52397 |
| refractive index of imaging lens 7A | n7A | 1.52397 |
| aperture 2 (elliptic) | | 2.46 × 2.64 |
| angle (degree) of oblique incidence of laser in main scanning direction | | −90 |
| angle (degree) of oblique incidence of laser in sub-scanning direction | | −3 |
| maximum exit angle (degree) of ray | | 45.078 |
| coordinates (mm) of rotation center of polygon mirror | X direction | −5.683 |
| | Y direction | 4.315 |
| number of surfaces of polygon mirror | | 4 |
| circumscribed circle diameter (mm) of polygon mirror | | φ20 |
| effective scanning width | W | 214 |
| Kθ coefficient | K (rad/mm) | 136 |

| Optical arrangement | | | |
|---|---|---|---|
| | X direction | Y direction | Z direction |
| light source 1 | 0.000 | −113.844 | −5.966 |
| aperture 2 | 0.000 | −97.045 | −5.086 |
| incident surface of collimator lens 3 | 0.000 | −95.048 | −4.981 |
| exit surface of collimator lens 3 | 0.000 | −94.049 | −4.929 |
| incident surface of cylinder lens 4 | 0.000 | −79.890 | −4.187 |
| exit surface of cylinder lens 4 | 0.000 | −76.894 | −4.030 |
| on-axis deflection point C0 | 0.000 | 0.000 | 0.000 |
| incident surface of imaging lens 6A | 17.200 | −0.237 | 0.000 |
| exit surface of imaging lens 6A | 23.200 | −0.237 | 0.000 |
| incident surface of imaging lens 7A | 39.200 | −0.237 | 2.240 |
| exit surface of imaging lens 7A | 44.200 | −0.237 | 2.240 |
| surface 8A to be scanned | 161.114 | −0.237 | 0.000 |

TABLE 4

| | collimator | | cylinder lens | | imaging lens | | imaging lens 7A | |
|---|---|---|---|---|---|---|---|---|
| | incid | exit | incide | exit | incide | exit | incide | exit |
| | main scanning direction | | | | | | | |
| R | ∞ | — | ∞ | ∞ | — | — | — | 3.44600E+02 |
| C5 | — | | | | | | | |
| K | | | | | — | — | — | — |
| B4 | | | | | 6.2444 | — | — | −3.40313E− |
| B6 | | | | | 5.8484 | 1.2596 | — | 1.48613E−09 |
| B8 | | | | | | | 2.6146 | −7.81994E− |
| B1 | | | | | | | | 1.86946E−16 |
| B4 | | | | | 6.2444 | — | — | −3.40313E− |
| B6 | | | | | 5.8484 | 1.2596 | — | 1.48613E−09 |
| B8 | | | | | | | 2.6146 | −7.81994E− |
| B1 | | | | | | | | 1.86946E−16 |

TABLE 4-continued

| | collimator | | cylinder lens | | imaging lens | | imaging lens 7A | |
|---|---|---|---|---|---|---|---|---|
| | incid | exit | incide | exit | incide | exit | incide | exit |
| | | | | sub-scanning direction | | | | |
| Rs | ∞ | — | 5.1950 | ∞ | 5.0000 | 1.6137 | 9.3012 | — |
| C3 | | | — | — | | | | |
| E2 | | | | | | — | 6.4507 | 8.97850E−05 |
| E4 | | | | | | — | — | −1.58329E− |
| E6 | | | | | | 9.1893 | 2.4165 | 1.40315E−10 |
| E8 | | | | | | | — | −3.65598E− |
| E1 | | | | | | | 9.3050 | −7.49214E− |
| E2 | | | | | | — | 6.4507 | 8.97850E−05 |
| E4 | | | | | | — | — | −1.98777E− |
| E6 | | | | | | 9.1893 | 3.3094 | 2.51207E−10 |
| E8 | | | | | | | — | −1.85814E− |
| E1 | | | | | | | 9.2721 | 5.56167E−17 |
| M0 | | | | | | | 6.5129 | −5.58537E− |
| M2 | | | | | | | 1.4529 | 7.37889E−05 |
| M4 | | | | | | | 3.8232 | −3.05830E− |
| M6 | | | | | | | — | 1.13393E−11 |
| M8 | | | | | | | 5.2352 | −4.52667E− |
| M1 | | | | | | | 1.0468 | 3.18625E−17 |
| M0 | | | | | | | 6.5129 | −5.58537E− |
| M2 | | | | | | | 6.3194 | 5.64711E−05 |
| M4 | | | | | | | — | −6.36983E− |
| M6 | | | | | | | 8.4638 | 3.48609E−11 |
| M8 | | | | | | | — | 1.62926E−14 |
| M1 | | | | | | | — | −1.99551E17 |

Note that unlike the first embodiment, a radius of curvature (a radius of curvature of the sagittal line) Rs* in the sub-scanning section at a position far apart by Y from the optical axis in the main scanning direction is given by the following equation (5).

$$1/Rs^* = 1/Rs + E_2 \times Y^2 + E_4 \times Y^4 + E_6 \times Y^6 + E_8 \times Y^8 + E_{10} \times Y^{10} \quad (5)$$

(where Rs is the radius of curvature of the sagittal line on the optical axis, and $E_2$, $E_4$, $E_6$, $E_8$, and $E_{10}$ are sagittal line change coefficients)

The main scanning direction asymmetry of the tilt change amount of the sagittal line is expressed in the following way on the side where a semiconductor laser 1 of the optical scanning apparatus is not arranged and on the side where the semiconductor laser 1 is arranged. That is, the values of the aspherical coefficients are changed between the side where the semiconductor laser 1 is not arranged and the side where the semiconductor laser 1 is arranged. The main scanning direction asymmetry of the non-arc amount of the sagittal line is also expressed by changing the aspherical coefficients between Upper and Lower.

Figure 9:
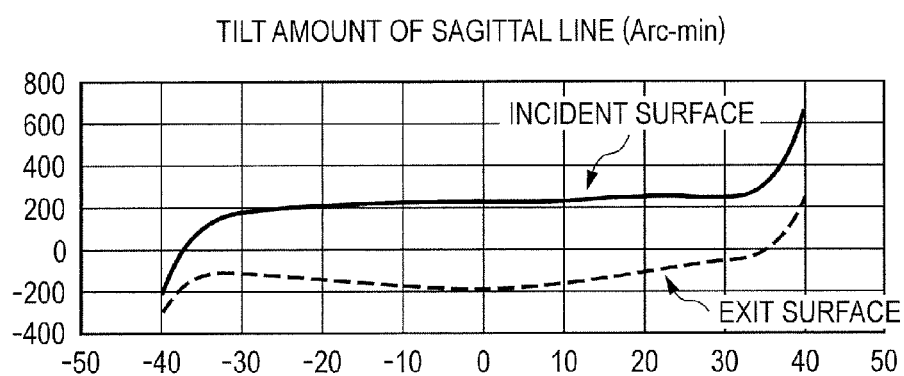
FIG. 9 is a view for illustrating changes in the tilt amount of the sagittal line on the incident and exit surfaces of the imaging optical element 7A.

FIG. 9 is a graph that plots the tilt amounts of the sagittal line on the incident surface and the exit surface of the imaging optical element 7A along the abscissa representing the position in the main scanning direction. When the tilt amount is given from above the optical axis and changed in the main scanning direction, spot distortion caused by twist of wave aberration and bending of the scanning line on the surface to be scanned are suppressed. Although not illustrated, as for the bending of the scanning line, the difference between the maximum value and the minimum value is as small as 9.1 μm (smaller than 10 μm) at all image heights, though the scanning angle of view is wider than in the first embodiment.

Figure 10:
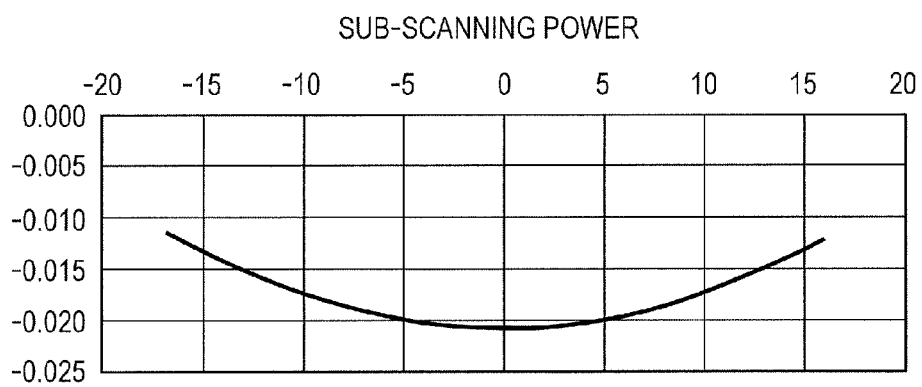
FIG. 10 is a view for illustrating a change in the sub-scanning power of an imaging optical element 6A.

FIG. 10 is a graph that plots a change in the power in the sub-scanning section (sub-scanning power) of an imaging optical element 6A according to this embodiment along the abscissa representing the position in the main scanning direction. As illustrated, when the sub-scanning power on the axis (Y=0) is negative, the amount of the curve of the scanning locus on the imaging optical element 7A can be decreased by weakening the negative power toward the off-axis (ends in the main scanning direction).

More specifically, when the sub-scanning power of the imaging optical element 6A is constant, the difference between the maximum value and the minimum value of the scanning locus on the incident surface of the imaging optical element 7A is 0.97 mm. In this embodiment, however, the difference between the maximum value and the minimum value is 0.72 mm, as is apparent from FIG. 8A. For this reason, the height can be decreased by 0.25 mm on one side of the lens or by 0.5 mm totally on the upper and lower sides, as compared to the case in which the sub-scanning power is constant.

When the sub-scanning power is positive, the amount of the curve of the scanning locus on the imaging optical element 7A can be decreased by strengthening the positive power toward the ends in the main scanning direction. Decreasing the curve of the scanning locus is equivalent to reducing the interval between the origin position lines CLa' and CLb' and the scanning light beam. It is therefore possible to suppress coma described in the first embodiment.

As described above, each lens surface of the imaging optical elements 7A and 7B is decentered such that the origin position lines CLa' and CLb' exist in the region sandwiched between the marginal rays at the two ends of the scanning light beam in the sub-scanning direction. Since the origin position lines CLa' and CLb' and the actual locus of the light beam are thus made close, it is possible to achieve more accurate mold correction and reduction of the number of times of correction.

In addition, a multi-stage lens formed by integrating the two imaging optical elements 7A and 7B is employed, and the change in the sub-scanning power of the imaging optical element 6A which is the closest to the deflector is appropriately controlled, thereby achieving a lost cost while suppressing the lens height of the multi-stage lens. Furthermore, using this imaging optical element with a suppressed height allows to increase the degree of freedom in leading the optical path of the optical scanning apparatus and also make the optical scanning apparatus compact.

In this embodiment, the imaging optical element optically closest to the surface to be scanned out of the plurality of imaging optical elements included in the imaging optical system is formed as a multi-stage lens. However, the present invention is not limited to this. That is, even when the decentered lens whose thickness changes between one end side in the widthwise direction and the opposing other end side is employed as another imaging optical element, the effect of decreasing the height of the lens, the effect of suppressing the coma, and the effect of achieving more accurate mold correction can similarly be obtained. Note that in this embodiment, the imaging optical system is formed from two imaging optical elements. However, the present invention is not limited to this, and the imaging optical system may be formed from three or more imaging optical elements.

First Modification

In the above-described embodiments, both the incident surface and the exit surface of each imaging optical element included in the imaging optical system are tilted and decentered in the sub-scanning section including the light beam (or the optical axis) that scans the image center. However, the present invention is not limited to this. At least one of the incident surface and the exit surface of each imaging optical element may be tilted and decentered in the sub-scanning section including the light beam that scans the image center.

Second Modification

In the above-described embodiments, only the exit surface of each imaging optical element in the sub-scanning section is formed into a non-arc shape. However, the present invention is not limited to this. Only the incident surface in the sub-scanning section may be formed into a non-arc shape or both the incident surface and the exit surface in the sub-scanning section may be formed into a non-arc shape. That is, causing at least one lens surface of the imaging optical element in the sub-scanning section to have a non-arc shape suffices.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-098674, filed Apr. 24, 2012, which is hereby incorporated by reference herein in its entirety.

What is claimed is:

1. An optical scanning apparatus comprising:
a light source;
a deflector that deflects a light beam emitted from the light source in a main scanning direction;
an incident optical system that makes the light beam emitted from the light source obliquely enter a deflecting surface of the deflector in a sub-scanning section perpendicular to the main scanning direction; and
an imaging optical system that includes a first imaging optical element and condenses the light beam deflected by the deflector onto a surface to be scanned,
wherein all origins of a first aspherical surface formula, which defines a surface shape of an incident surface of the first imaging optical element in the sub-scanning section at all image height positions, exist on a first line that extends in the main scanning direction when each of the origins is projected onto a plane perpendicular to an optical axis of the imaging optical system,
wherein all origins of a second aspherical surface formula, which defines a surface shape of an exit surface of the first imaging optical element in the sub-scanning section at all image height positions, exist on a second line that extends in the main scanning direction when each of the origins is projected onto the plane perpendicular to the optical axis,
wherein at least one of the incident surface or the exit surface is decentered in the sub-scanning section including the optical axis so that the first line and the second line exist in a region sandwiched between marginal rays of the light beam deflected by the deflector in the plane perpendicular to the optical axis.

2. An apparatus according to claim 1, wherein the imaging optical includes a plurality of imaging optical elements, the first imaging optical element is one of the plurality of imaging optical elements optically closest to the surface to be scanned.

3. An apparatus according to claim 1, wherein at least one surface of the incident surface or the exit surface is tilted and decentered in the sub-scanning section including the optical axis, and a tilt angle of the at least one surface changes in the main scanning direction so as to make bending of a scanning locus of the light beam on the surface to be scanned small.

4. An apparatus according to claim 1, wherein a power of the first imaging optical element in the sub-scanning section changes in the main scanning direction so as to make bending of a scanning locus of the light beam on one of the incident surface and the exit surface small.

5. An apparatus according to claim 4, wherein:
when power in the sub-scanning section including the optical axis is positive, the positive power becomes strong toward an end in the main scanning direction, and
when the power in the sub-scanning section including the optical axis is negative, the negative power becomes weak toward the end in the main scanning direction.

6. An apparatus according to claim 1, wherein at least one of the incident surface or the exit surface is decentered in the sub-scanning section including the optical axis so that each of the first line and the second line is set across a principal ray of the light beam deflected by the deflector.

7. An apparatus according to claim 1, wherein at least one of the incident surface or the exit surface has a non-arc shape in the sub-scanning section.

8. An apparatus according to claim 1, wherein the first imaging optical element comprises a plurality of lens surfaces laminated in a sub-scanning direction, a plurality of light beams passing through the plurality of lens surfaces enter corresponding different surfaces to be scanned.

9. An apparatus according to claim 1, wherein the first imaging optical element is configured to have a thickness changing between one end side and an opposing other end side in sub-scanning direction.

10. An apparatus according to claim 1, wherein:
the light source comprises a plurality of light-emitting portions,
the imaging optical system condenses a plurality of light beams from the plurality of light-emitting portions onto a plurality of corresponding surfaces to be scanned, and
the first imaging optical element is arranged on each of optical paths of the plurality of light beams.

11. An image forming apparatus comprising:
an optical scanning apparatus including:
a light source;
a deflector that deflects a light beam emitted from the light source in a main scanning direction;

an incident optical system that makes the light beam emitted from the light source obliquely enter a deflecting surface of the deflector in a sub-scanning section perpendicular to the main scanning direction; and an imaging optical system that includes a first imaging optical element and condenses the light beam deflected by the deflector onto a surface to be scanned, wherein all origins of a first aspherical surface formula, which defines a surface shape of an incident surface of the first imaging optical element in the sub-scanning section at all image height positions, exist on a first line that extends in the main scanning direction when each of the origins is projected onto a plane perpendicular to an optical axis of the imaging optical system, wherein all origins of a second aspherical surface formula, which defines a surface shape of an exit surface of the first imaging optical element in the sub-scanning section at all image height positions, exist on a second line that extends in the main scanning direction when each of the origins is projected onto the plane perpendicular to the optical axis, wherein at least one of the incident surface or the exit surface is decentered in the sub-scanning section including the optical axis so that the first line and the second line exist in a region sandwiched between marginal rays of the light beam deflected by the deflector in the plane perpendicular to the optical axis;

a developer that develops, as a toner image, an electrostatic latent image formed on a photosensitive member arranged on the surface to be scanned by the optical scanning apparatus;

a transfer device that transfers the developed toner image to a transfer material; and a fixer that fixes the transferred toner image to the transfer material.

12. An image forming apparatus according to claim 11, further comprising a printer controller that converts a signal input from an external device into image data.

* * * * *